UNITED STATES PATENT OFFICE.

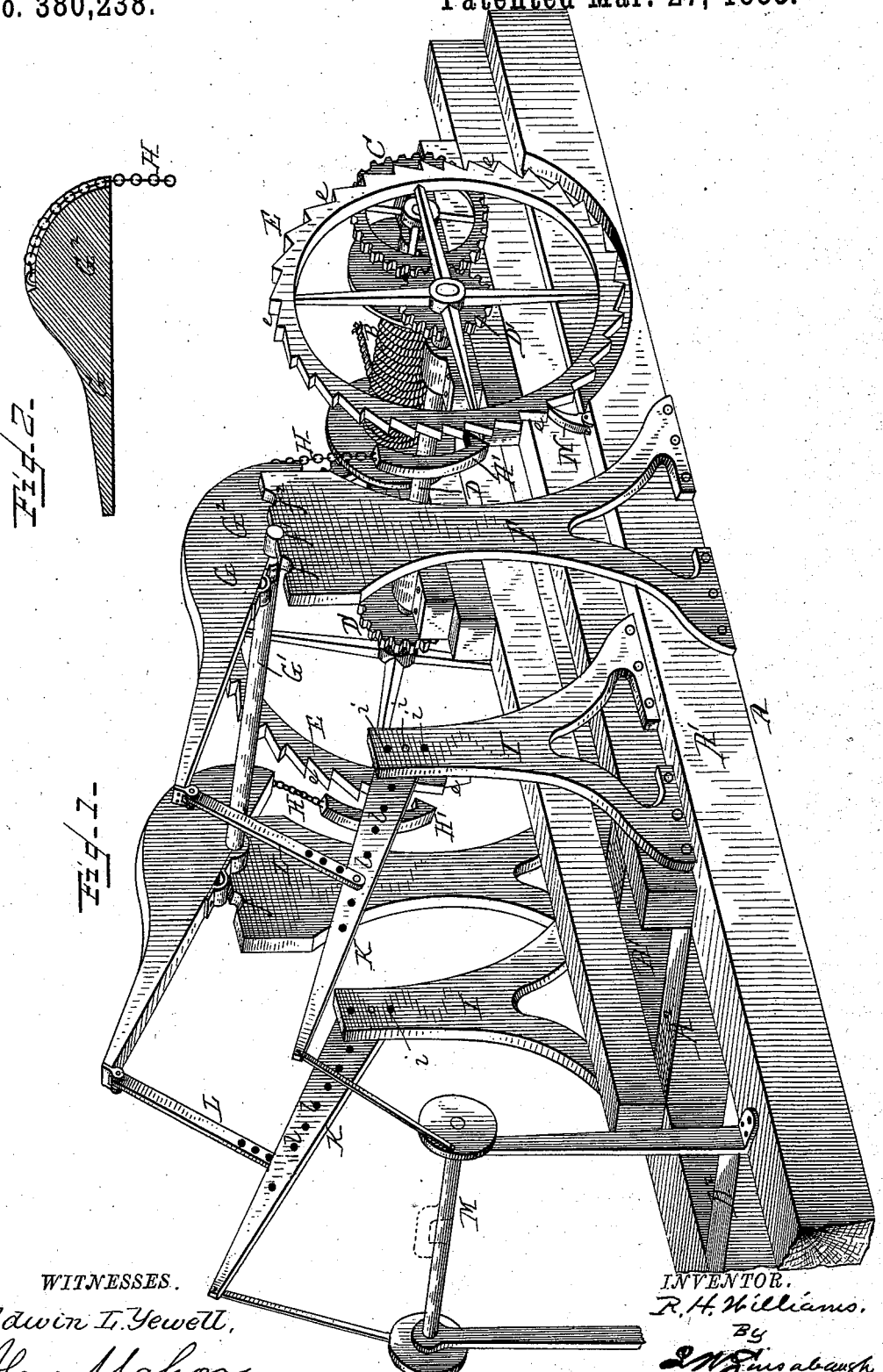

ROBERT H. WILLIAMS, OF NEWTON, IOWA.

CRANK-AND-LEVER MECHANISM.

SPECIFICATION forming part of Letters Patent No. 380,238, dated March 27, 1888.

Application filed August 17, 1887. Serial No. 247,202. (No model.)

*To all whom it may concern:*

Be it known that I, ROBERT H. WILLIAMS, a citizen of the United States of America, residing at Newton, in the county of Jasper and State of Iowa, have invented certain new and useful Improvements in Crank-and-Lever Mechanism, of which the following is a specification, reference being had therein to the accompanying drawings.

My invention relates to that class of mechanisms for moving or handling bodies of great weight by manual labor or other small amount of power; and my invention consists in the combination of the ratchet-faced drum-actuating wheel, with a dog suspended from its actuating-lever by a flexible connection and adapted to engage the teeth of the wheel to revolve the same.

It further consists in the combination, with the ratchet-faced drum-actuating wheel, of the flexibly-suspended dog and the lever having the eccentric-cam formed upon the end thereof.

It further consists in certain novel combinations and arrangement of parts, all as hereinafter set forth.

In the accompanying drawings, Figure 1 is a perspective view of a device embodying my improvements. Fig. 2 is a view of the chain and the operating-lever.

A frame, A, consisting of the longitudinal side timbers, A', and cross-timbers A², is employed for supporting the operating parts hereinafter referred to. Near one end of this frame, in suitable bearings, is mounted a shaft or windlass, B, having upon each end a toothed wheel, C. Adjacent and parallel with the windlass or drum is mounted, in suitable bearings, a shaft, D, having upon each end pinions D', meshing with the toothed wheels C. Upon this shaft, also outside the pinions, are mounted the large wheels E, having their peripheral faces notched or provided with ratchet-teeth $e$, hereinafter referred to.

Adjacent to the large wheels and secured to the frame or bed are standards F, in the upper portion of which are formed bearings $f\ f'\ f^2$ for the shaft of the levers G. The levers are mounted on the shaft G', and said levers are provided with eccentric or cam-formed ends G², to which are connected chains or similar flexible connections, H, which lie in grooves formed in the curved faces of the eccentric-cams, said chains, straps, or ropes being connected to the lever at the point of junction of the handle portion with the cam portion, and to the opposite ends are connected the dogs H', said dogs being suspended from the levers to project far enough forward to overhang the periphery of the wheel to always engage the teeth of said drum-actuating wheel under the different adjustments of the lever.

In rear of the standards F are two standards, I, in which are mounted levers K, and which levers are connected between the fulcrum and power end with the power end of levers G by links L.

The standards I are provided with a series of perforations, $i$, for adjusting or changing the point of fulcrum of the levers K, and the levers K are also provided with a series of perforations, $l$, for adjusting or changing the point of connection of the links L with said levers.

The power ends of the levers K extend rearward and have the power applied thereto either by hand or by means of crank-arms extending from a revolving shaft, M, or through wrist-pins projecting from heads or disks mounted on the ends of the revolving shaft, and said shaft being revolved in any preferred way.

As before stated, the upper ends of the standards F are provided with a series of half-bearings, $f\ f'\ f^2$, for changing the point of fulcrum of the levers G.

The operation of the device is as follows: Power being applied to levers K, they act through the links L on the power end of levers G, moving said levers and causing the dogs H', suspended therefrom, to engage the teeth of the wheels E, and through the pinions D' and toothed wheels C to revolve the shaft or windlass B and wind the rope or chain connected to the body to be moved thereon. Pawls N, mounted on the frame, engage the teeth of the wheels E as they revolve, and hold said wheels from backward movement when released by the pawls when said pawls are being moved or dropped to re-engage the wheels.

The levers and pawls are arranged to act alternately to cause a continuous revolution of the wheels and drum; but, if found desirable, they may act simultaneously or in unison.

Having now described my invention, I claim—

1. The combination of the ratchet-faced drum-actuating wheel, the flexibly-suspended actuating-dog, and the lever provided with the eccentric-cam end from which the dog is suspended, substantially as set forth.

2. In a machine for raising or moving large bodies, the combination of the ratchet-faced drum-actuating wheels, the levers having the dogs suspended therefrom by a flexible connection to engage the wheels, and the second set of levers connected to the power end of the first-named or dog-operating levers through links at a point between their power end and fulcrum, substantially as set forth.

3. The combination of the ratchet-faced drum-actuating wheels, the dog-actuating levers, the dogs suspended therefrom by a flexible connection, the second set of levers connected to the dog-operating levers, and the revolving shaft connected to the last-named levers through the link-connections, and from which shaft movement is communicated to the various parts, substantially as set forth.

4. The combination of the ratchet-faced drum-actuating wheels, the dogs suspended from their actuating-levers by the flexible connections, levers of the first order for operating the same, and levers of the second order acting on the dog-operating levers, substantially as set forth.

In testimony whereof I affix my signature in presence of two witnesses.

ROBERT H. WILLIAMS.

Witnesses:
STELLA SHIPLEY,
JOHN M. WORMLEY.